United States Patent
Wu et al.

(10) Patent No.: US 10,200,332 B2
(45) Date of Patent: Feb. 5, 2019

(54) DELIVERY OF HAPTICS TO SELECT RECIPIENTS OF A MESSAGE

(71) Applicant: IMMERSION CORPORATION, San Jose, CA (US)

(72) Inventors: Liwen Wu, Montreal (CA); Henry Da Costa, Montreal (CA); Changyu Yang, Montreal (CA); Vincent Levesque, Montreal (CA); Hua Yu, Montreal (CA); David M. Birnbaum, San Jose, CA (US); Christopher Ullrich, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 232 days.

(21) Appl. No.: 14/968,363

(22) Filed: Dec. 14, 2015

(65) Prior Publication Data

US 2017/0171135 A1  Jun. 15, 2017

(51) Int. Cl.
| | |
|---|---|
| *G06F 15/16* | (2006.01) |
| *H04L 12/58* | (2006.01) |
| *G08B 6/00* | (2006.01) |
| *G06Q 10/10* | (2012.01) |

(52) U.S. Cl.
CPC ............ *H04L 51/24* (2013.01); *G06Q 10/10* (2013.01); *G08B 6/00* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,896,524 B2 | 11/2014 | Birnbaum et al. | |
| 9,019,087 B2 | 4/2015 | Bakircioglu et al. | |
| 9,607,491 B1 * | 3/2017 | Mortimer | G08B 6/00 |
| 2009/0305744 A1 | 12/2009 | Ullrich | |
| 2010/0198757 A1 * | 8/2010 | Cheng | G06Q 10/06 706/12 |
| 2011/0018697 A1 * | 1/2011 | Birnbaum | A63F 13/10 340/407.2 |

(Continued)

FOREIGN PATENT DOCUMENTS

| | | | | |
|---|---|---|---|---|
| WO | 02 03172 A2 | 1/2002 | | |
| WO | WO-0203172 A2 * | 1/2002 | ............... | G06F 3/01 |

(Continued)

OTHER PUBLICATIONS

Extended European Search Report, dated Jun. 13, 2017, Application No. EP1620387.6-1871, 8 pages.

*Primary Examiner* — Phyllis A Book
(74) *Attorney, Agent, or Firm* — Miles & Stockbridge P.C.

(57) ABSTRACT

Systems and methods, by which a sender can deliver haptic messages to selected recipients within a larger group of recipients that are otherwise receiving a common message, are disclosed. The haptic messages can be individualized according to a recipient's profile, preference, and/or relationship with the sender. The haptic message can be created by the sender or selected from a pre-existing library of messages, and can be delivered automatically or assigned by the sender. The haptic messages can be dynamically changed in response to haptic feedback and supplemental data collected from the recipients that is used to update preferences and profiles of message recipients.

22 Claims, 6 Drawing Sheets

(56) References Cited

U.S. PATENT DOCUMENTS

| | | |
|---|---|---|
| 2011/0264491 A1 | 10/2011 | Birnbaum et al. |
| 2012/0046770 A1 | 2/2012 | Becker et al. |
| 2012/0062371 A1* | 3/2012 | Radivojevic ............ G06F 3/016 340/407.1 |
| 2013/0046834 A1* | 2/2013 | Barber ................ H04L 12/6418 709/206 |
| 2013/0207793 A1* | 8/2013 | Weaber ................ G06F 1/1601 340/407.2 |
| 2013/0227409 A1* | 8/2013 | Das ........................ H04L 51/32 715/702 |
| 2013/0305169 A1* | 11/2013 | Gold ........................ G09B 5/00 715/757 |
| 2014/0002376 A1 | 1/2014 | Oliver et al. |
| 2015/0072789 A1 | 3/2015 | Heubel et al. |
| 2015/0207916 A1* | 7/2015 | Xue ........................ H04W 4/12 455/412.2 |

FOREIGN PATENT DOCUMENTS

| | | | |
|---|---|---|---|
| WO | 2013 085834 A1 | 6/2013 | |
| WO | 2013 085837 A1 | 6/2013 | |
| WO | WO-2013085837 A1 * | 6/2013 | ............. H04L 51/32 |

* cited by examiner

DELIVERY OF HAPTICS TO SELECT RECIPIENTS OF A MESSAGE

TECHNICAL FIELD

This patent document relates to managing and delivery of haptic effects, and more particularly to delivery of haptic effects to select recipients of a message.

BACKGROUND

With group messaging and social media applications, a sender is able to define members who will receive a general message. However, when the sender wants to provide additional information with a general group message or general posting to social media, the options have been limited. Haptic effect messaging can provide additional information with the general message. Haptics is a tactile and force feedback technology that takes advantage of a user's sense of touch by applying haptic feedback effects (i.e., "haptic effects"), such as forces, vibrations, and motions, to the user. Thus, haptic technology has expanded the scope of information that can be delivered to a receiver.

In the effort to provide additional information, an outgoing message can comprise a general message and a signal to generate a haptic effect for a receiver. When a sender transmits a posting or group message, the message can be categorized by a predetermined or user defined grouping parameter such as family, friends, or colleagues. Based on the foregoing, there is a need for an improved system to manage, specify, and update haptic preferences for receivers of general postings and group messages.

SUMMARY

In general terms, this disclosure is directed to an apparatus and method for sending specific haptic messages to an identified subset of receivers, while excluding receivers not in the subset from receiving the haptic message. Additional features to the system and method include receiving haptic feedback data from the initial haptic message recipients. The feedback can be analyzed and used to update parameters and preferences for potential subsequent haptic messages.

One aspect of the disclosure is an apparatus for delivering a haptic effect to receiving devices. The apparatus can comprise: a memory for storing a message and haptic effect data defining a haptic effect; a transmitter that is configured to transmit the message and the haptic effect data; and a programmable circuit communicatively associated with the memory and the transmitter. The programmable circuit can be programmed to deliver the message to a plurality of receiving devices and to deliver the haptic effect data to only a subset of the receiving devices.

Another aspect of the disclosure is a method for delivering a message and a haptic effect. The method can comprise delivering a message to a plurality of receiving devices, wherein each receiving device has an identifier; grouping a portion of the plurality of receiving devices into at least one subset of receiving devices based on the identifiers of the receiving devices; associating at least one haptic effect to the receiving devices within the subset; and delivering the at least one haptic effect to the receiving devices within the subset.

An additional aspect of the disclosure is an apparatus for delivering a haptic effect. The apparatus can comprise: a memory that stores a message, a haptic profile, haptic effect data, and data received from a plurality of receiving devices. The haptic effect data can define a haptic effect and the haptic profile can identify the plurality of receiving devices and associate each of the identified receiving devices to at least one predetermined set of haptic effect data. A transmitter can be configured to transmit the message and the haptic effect data, in addition to receiving data from remote devices. A programmable circuit communicatively associated with the memory and the transmitter can be programmed to deliver the message to a plurality of receiving devices. The programmable circuit can be further programmed to selectively deliver the set of haptic effect data to only a subset of the receiving devices, to generate the set of haptic effect data based at least in part on the data collected from remote devices, to update the set of haptic effect data by modifying a preexisting set of haptic effect data, and to deliver the modified haptic effect data to at least one receiving device in the subset of receiving devices.

Another aspect of the disclosure can include an apparatus for delivering a haptic effect to at least one receiving device having an installed social application and haptic message support with a capability of transmitting feedback information back to the apparatus. The apparatus includes a memory configured to store a message, a haptic profile, haptic effect data defining a haptic effect, and feedback information received from the receiving device. The haptic profile can identify the receiving device and associate the identified receiving device to at least one predetermined set of haptic effect data. The apparatus further has a transmitter configured to transmit the message and the haptic effect data, and to receive feedback information from the receiving device. The apparatus also includes a programmable circuit communicatively associated with the memory and the transmitter and programmed to retrieve a set of haptic effect data from a haptic profile for the receiving device, to dynamically modify the retrieved set of haptic effect data based at least in part on the received feedback information from the receiving device, and to deliver the modified haptic effect data to the receiving device.

BRIEF DESCRIPTION OF DRAWINGS

Referring to the drawing, wherein like reference numerals represent like parts and assemblies throughout the several views.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is dearly inappropriate. The use of or means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

This disclosure relates to systems and methods by which a sender can selectively deliver haptic messages to different groups of people when posting or sending a common primary message. The selective haptic messages can be automatically sent out according to a recipient's profile, preference, and/or relationship with the sender. The sender can also assign private haptic messages manually for certain recipients. Different patterns of haptics are assigned for different meanings, and learned by both the sender and the recipient. Senders can use a common haptic language generally known and shared in the public, or the users can design their own secret haptic languages known only to selected recipients. In addition, an affective sensing system can be used to detect the sender's emotions to automatically generate haptic messages that reflect the sender's emotions at the time the haptic message was sent. The sender can decide if he/she would like to send the automatically generated haptic message and/or to whom the haptic message should be sent.

For example, the sender may desire to send congratulatory haptics to certain friends who may be fans of a winning team, while also sending different haptics to a different set of friends who may be fans of a losing team. In another example, the sender may be in distress and seeking help. The sender can post an innocuous message in a public forum and embed haptics targeting close friends and/or family, wherein the embedded haptics indicate that the sender is in trouble and needs help. A social application can allow the sender to select and target a haptic message at specific people or groups of people. In yet another example, the sender can avoid being publicly rude while responding to a social media posting. The sender can respond to the post with a generic message that does not openly offend, while also responding with a haptic message that is more indicative to the sender's feelings.

While the embodiments described in the disclosure relate primarily to the delivery of haptic messages in "social" applications, the disclosure is not limited to uses in social applications. The disclosure encompasses all apparatus/systems and methods for transmitting both a primary and a haptic message to a plurality of receivers equipped with haptic message support, wherein the sender can send different haptic messages to selective ones or groups of receivers while sending the same primary message to all receivers. Delivering or attaching different haptic messages with the same primary message allows the primary message to have different meanings or interpretations to the selectable recipients based on the content of the different associated haptic messages received by the recipient.

Figure 1:
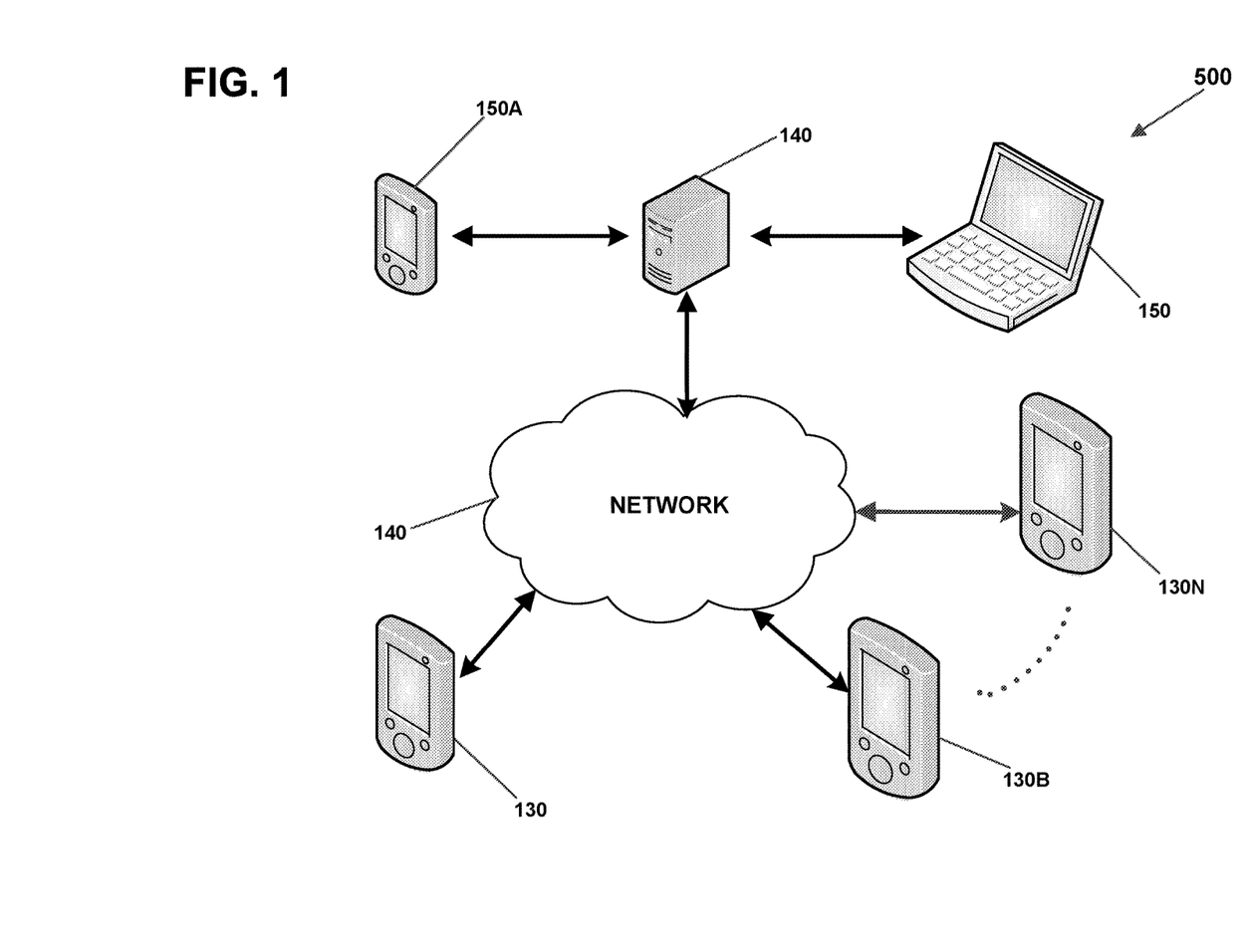
FIG. 1 is a functional schematic diagram of a haptic signaling and feedback system in accordance with one embodiment of the disclosure.

FIG. 1 represents a functional schematic diagram of a haptic message delivery system 100 according to one embodiment of the present disclosure. The general components of the system can include one or more sending devices 150A and B, a computing device 140 and plurality of receiving devices 130A, 130B, to 130n. Communication between the computing device 140 and receiving devices 130 can be completed through a network 110. The user of a sending device 150 can generate a posting having a general message that is available for all receiving devices 130. Further, the posting can include a haptic message that can be sent simultaneously to receivers 130A-130n. In some implementations, at least some or all of the functions described above with respect to a sending device 150 can be performed within a computing device 140. In other words, computing device 140 when configured as a portable device can additionally be configured to function as another sending device 130. In such an embodiment, the functions of the computing device 140 would be integrated into sending devices 150A.

The components illustrated in FIG. 1 can be communicably coupled to one another via various communication links generally illustrated as being embodied within a network 110. The network can include wired or wireless connections. In some aspects of the disclosure, the network can include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other types of networks and or network components. Various inputs, outputs, configurations, and/or other information described herein as being stored or storable can be stored in one or more databases (not illustrated in FIG. 1). Such databases can be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others can also be used, incorporated, or accessed. The database can comprise one or more such databases that reside in one or more physical devices and in one or more physical locations. The database can store a plurality of types of data and/or files and associated data or file descriptions, administrative information, or any other data.

Figure 2:
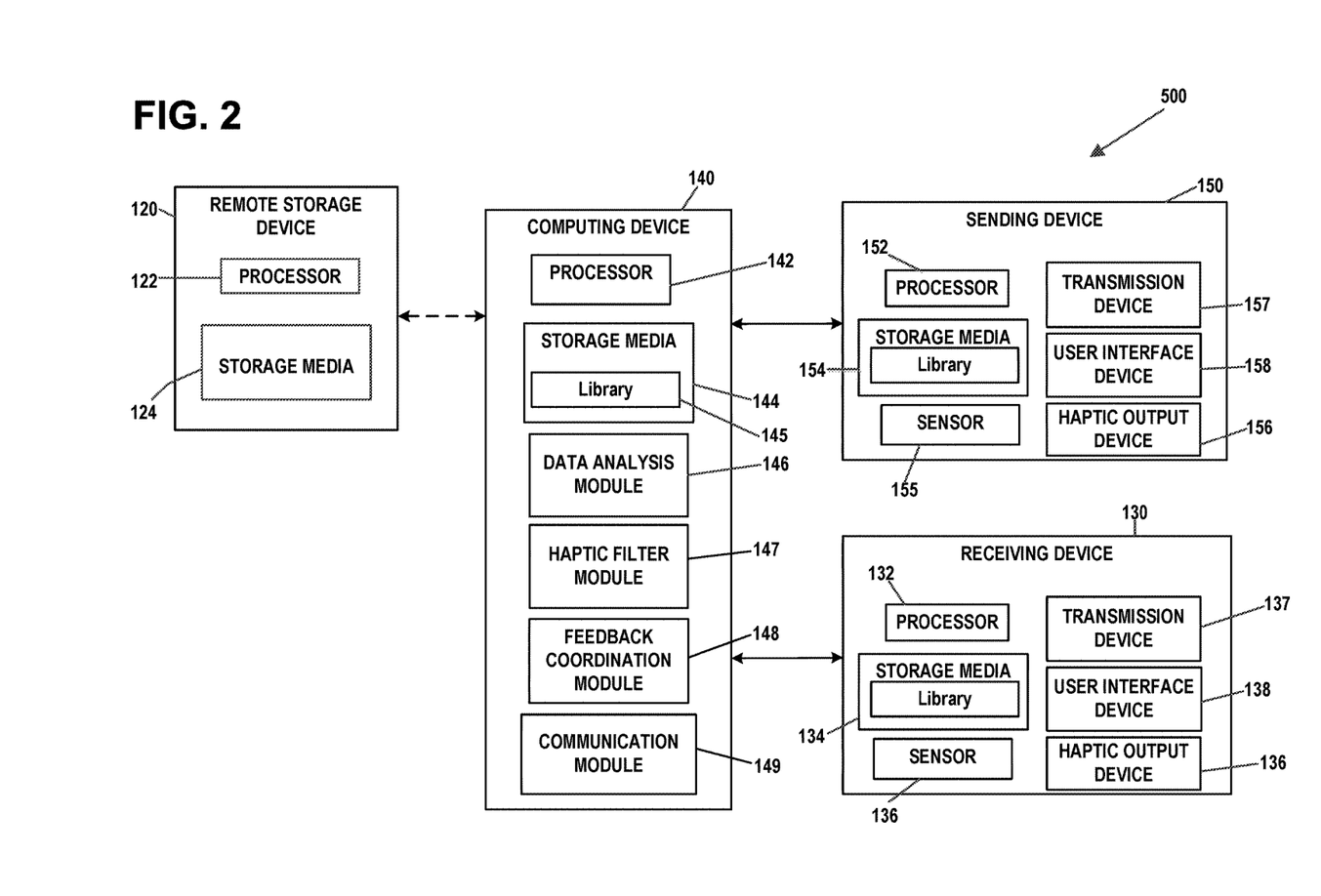
FIG. 2 is a functional block diagram of system architecture of a haptic signaling and feedback system that could be used to implement the system of FIG. 1.

FIG. 2 illustrates a functional block diagram 200 of internal components of the system 100 of FIG. 1 for transmitting haptic messages via public postings or group messaging, an email, a short message service (SMS) message, an instant message (IM), a tweet message, etc. The full message transmitted by the delivering system 100 includes both a general or primary message and a haptic message. In addition, the method of transmitting the full message can impact the timing a recipient receives the haptic message. For example, during an instant message session the initial haptic message transmission and haptic message feedback can be synchronous. In another example, social media posting may not be initially received by the recipient such that the haptic message feedback can be asynchronous. The embodiment illustrated will be described with respect to using a dynamic haptic message generating method. The method can aid users of social applications to improve communication in haptic languages. According to an aspect of the disclosure, system 100 can include a remote storage device 120, a plurality of receiving devices 130, a computing device 140, and a sending device 150. To simplify the disclosure, only a single receiving device 130 is shown in FIG. 2, it being understood that a plurality of such receiving devices could be present in an operational system. Remote storage device 120 can include a processor 122, a non-transitory storage media 124, and/or other components. Remote storage device 120 can include "cloud" (e.g., networked) storage devices, local storage devices, and/or other types of devices that can receive and transfer digital content.

The receiving device 130 can include generally portable devices that are configured to receive a message. For example, the receiving device can be a cellular phone, computer, or video game controller. In some implementations, receiving devices 130 can each include a processor 132, a non-transitory storage media 134, a haptic output device 136, a user interface device 138, and/or other components such as a transmission device 137 and a sensor 135. Some receiving devices 130 can act as dedicated haptic output devices, dedicated storage devices, dedicated user input devices, dedicated sensor devices, or as a combination device that includes one or more of the foregoing functions. In one aspect of the system 100, the sending device 150 can include combinations of such functional devices as a processor 152, a non-transitory storage media 154, a haptic output device 156, a user interface device 158, and/or other components such as a transmission device 157 and a sensor 155.

Haptic output devices 136 and 156 can be configured to produce a haptic effect. The haptic effect can be defined as the tactile sensation produced on a user interface. The haptic output devices 136 and 156 can include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-fiber composite actuator, an electro-static actuator, an electro-tactile actuator, and/or another type of actuator that provides a physical feedback such as a haptic (e.g., vibrotactile) feedback. Haptic output devices 136, 156 can include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as an ultrasonic feedback, a puff of air using an air jet, etc.

User interface devices 138 and 158 can include a touchscreen, a camera, mechanical inputs, and/or other types of input components that a user can use to provide input to a receiving or sending device 130, 150. The transmission device 137 can include a component along with any supplemental components required to send and receive data. For example, in one aspect of the disclosure, the transmitter can enable wireless transmission of data. Similarly, the transmission device 157 of the sender can operate in the same manner as the transmission device 137 of the receiver 130.

In other examples, the receiving device 130 may include a sensor 135. Sensor 135 can include a three-dimensional ("3D") gyroscope, a 3D accelerometer, a 3D magnetometer, an image sensor (e.g., a charged coupled device ("CCD") or complementary metal-oxide semiconductor ("CMOS")), a temperature sensor, and/or other sensor devices. The sensor 135 can provide biometric parameters about the user of the receiving device such as body temperature, skin temperature, heart rate, skin moisture, pupil dilation, etc. The biometric information can be sensed from the user of the receiving device, collected, and provided back to the sender of the haptic message. Conversely, according to another aspect of the example of the system 100, the sending device 150 can also include a sensor 155 to provide collectable biometric information about the sender of the posting and haptic messages.

In some implementations of the system, computing device 140 can include one or more processors 142 programmed with one or more computer program modules, which can be stored in one or more non-transitory storage media 144. Computing device 140 can be programmed by the one or more modules to selectively provide haptic messages to receiving devices 130 and to receive feedback information related to the haptic effect message from the receiving devices 130 through their respective transmission devices 137 or from other devices related to the user of the receiving devices 137. Feedback information related to a haptic feedback message or data can be any information related to haptics that is sent from a receiving device or other device related to the use of the receiving device back to an initial sending device or other third party device related to the haptic messages and haptic data. The computing device modules can include a data analysis module 146, a haptic filtering module 147 a message coordination module 148, a communication module 149, and/or other modules, as will be understood by those skilled in the art.

In some implementations, data analysis module 146 can be configured to receive information from a user of a receiving device or from multiple users through the use of their respective sending and receiving devices. The information for an individual user can be categorized into a user profile wherein the profile can uniquely identify the user. The profile information can include, for example, device information, context information, haptic signal preferences, and biometric information.

For example, the device information can include a device identifier (e.g., a media access control ("MAC") address and/or identifier that can identify the device), device capability (e.g., whether the device is capable of providing haptic feedback, storing digital content, receiving user inputs, etc.), communication information such as a network address (e.g., Uniform Resource Locator or other network address) or port information where communication channels can be established for transferring digital content, and/or other device information. In a further aspect, context information can include user activity, user mood, whether the user is engaging in social media, whether the user is in a gaming application, the location of the user, etc. The haptic signal can be defined by parameters such as amplitude, frequency, waveform, duration, phase, pattern, attack time, fade time, lag/lead time, etc. The biometric information may be a part of the profile. The biometric information may be a more volatile component of a profile because the biometric information can be directly related to the contextual information. For example, the contextual information may indicate that the user of a receiving device is under duress. Thus, the user heart rate may be elevated. Analogously, when the user is asleep during at the receipt of a haptic message, the user's heart rate may be decreased.

The data analysis module 146 can be configured to work in conjunction with a social application, such as Facebook™, Twitter™, LinkedIn™, etc. While working with the social application, the data collected from a single receiving device can include predefined or updatable preferences of the user through the social application. Through the social application, the predefined and/or updatable preferences can be sharable. According to another aspect of the disclosure, the data analysis module 146 can be configured to analyze data received from gaming applications. For example, a user can interact with a gaming application such that a haptic message provides additional preferences of the user of the receiving device. In yet another aspect, the data analysis module can be configured to analyze data received from a diagnostic application. For example, a monitoring application can be running on the receiving device 130. The monitoring application can be operating in conjunction with the social application such that the monitoring application can collect data related to a user's activity while interacting with the social application. The data collected from the monitoring application can be further used to analyze a preference for a user.

The data analysis module 146 can also be configured to categorize the plurality of information from a group of receiving devices 130. During the analysis of group information, the data collected from the receiving devices 130 can be globally categorized into a haptic profile. The haptic profile can include a grouping of larger numbers of users based on an identified group preference.

In at least some embodiments, the haptic profile can be customized for an individual sender or receiver. The haptic profiles for the contacts of the sender can be determined by factors such as the sender, the recipients, and the result of data analysis. For example, for each contact, the sender can determine which group the contact belongs to according to the relationship between the sender and the contact. The recipient can share his/her haptic profile with the sender, and once the recipient updates his/her haptic profile, the profile of the contact can be automatically updated on the sender's side. Alternatively, the haptic profiles for contacts that do not belong to any group can be determined by the results of data analysis. The haptic profile for contacts belonging to custom groups also can be determined by the data analysis.

For example, if the sender would like to send a "Happy haptic message" to a recipient, the server 140 can first review the recipient's profile to see which haptic effect means "happy" for the recipient. If the search returns null, the server can recommend the "Happy haptic message" based on the result of the data analysis. In another example, the receiver can adjust his/her privacy settings of their haptic profile, wherein the haptic profile cannot be shared with the sender. Accordingly, the server can automatically convert the general "Happy Message" to the recipient's "Happy Message" when the recipient reads the message. In another example, a user may want to send a haptic message characterized as a happy message to a plurality of recipients. The haptic profile of the receiving devices, stored in the library 145, can indicate the plurality of recipients that would be positively receptive of a happy message. Further, the data collected can be used to determine recommendations to the sender based on a percentage of recipients that were positively receptive of the happy message.

In some implementations, the haptic filtering module 147 can be configured to establish filters based on the parameters generated by the data analysis module 146. In an example, a filter can be categorized as dynamic based, on the filter's operation method. For example, continual collection of data, which may include feedback information, in real time from the receiving devices 130 provides a large quantity of data. Thus, the collected data can be used to provide the optimal haptic message for a receiver. According to an aspect of the embodiment, the haptic filtering module can monitor the filters and make adjustments to the filtering definitions. The adjustments can be characterized as dynamic because prompting to initiate the filter definition may not be needed. Thus, when data is received the filter can continually update the preferences for a haptic message using the collected data.

There are also two types of filters: filters for specific users, and filters for all users. One filter can be applied to different haptic messages, while one haptic message can be filtered by several filters. Filters can be applied before the message is sent out by the sender or/and before the message is received by the recipient.

The sender device 150 can transmit a recommended haptic message based on filtering of the collected data. The filters can be dynamic, continually updating preferences using the continually collected data. The filters also can be real-time, collecting changes to user's data in real time and then applying the data to the filter in real time as it is collected. For example, profile information including the context information can be used to update the filter. As a part of updating the haptic message, the characteristics of a subsequent haptic message can be altered, such as the magnitude, the frequency, the number of pulses, duration, and/or other characteristics defined by the haptic feedback data. Further, there are applicable embodiments with one sender and one receiver.

In certain embodiments, the filters can be bidirectional. In one example, an outgoing haptic message can be filtered to a recommendation based on relationship to the receiver, profile settings of the receiver, activity status of the receiver, etc. In another example, an incoming haptic message can be filtered. When the incoming haptic message is received, the filters in the haptic filtering module can compare the received incoming haptic module to the updatable preferences of the initial sender. Similar to an outgoing haptic message, the filters can tune the incoming message to the preferences of the initial sender. According to another aspect, the filters can tune the preferences for a recipient by modifying haptic parameters associated with the receiver's user profile which can be performed continuously using haptic feedback and additional data from the receiver or from a plurality of receivers.

In some implementations, the message coordination module 148 can be configured to identify one or more receiving devices 130 that are to receive the haptic message. In other words, message coordination module 148 can determine one or more remote devices 130 that should receive the haptic message. Message coordination module 148 can identify receiving devices 130 based on the analysis performed by the data analysis module 146. Message coordination module 148 can consult a user profile to determine user preferences related to which haptic message should be provided. Further the message coordination module can determine the appropriate message to send to the identified receiving devices based on the filtering executed by the haptic filter module 147. Further, if multiple haptic messages are being sent, the message coordination module 148 can determine which subset of receiving devices will receive a message.

Figure 3:
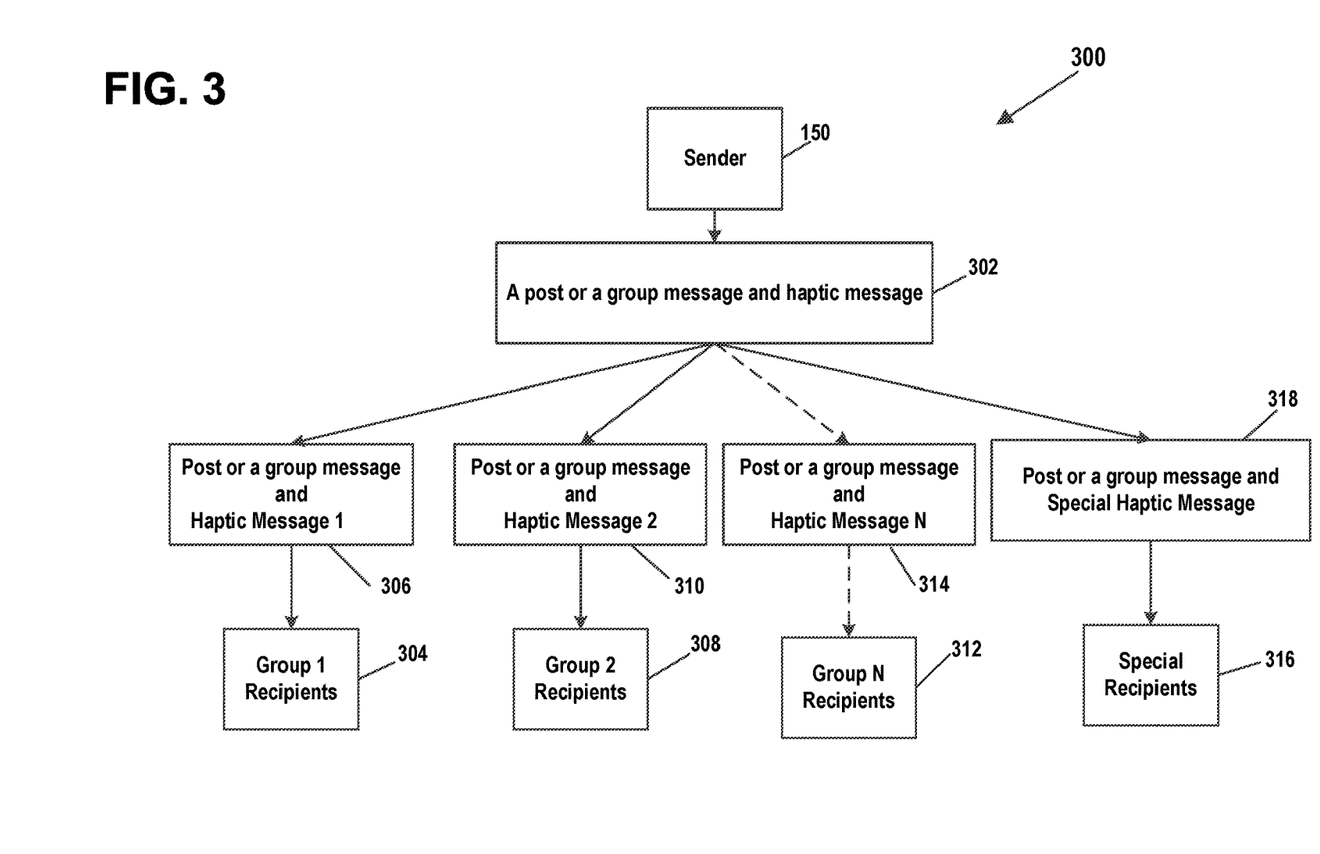
FIG. 3 is a diagrammatic representation illustrating selective delivery of haptic and group messages.

FIG. 3 depicts a flow chart 300 of the activity of the message coordination module 148 with respect to a message. A sender can provide a message 302 to a plurality of recipients from his/her sending device 150. The message 302 has multiple components. For example, the first component can be a text message commonly provided directly to a group or groups or as a posting to a social media application. In other examples, the message can be an emoticon or sticker, an image, a voice message, a video recording, or even just a "like" on Facebook™. The second component can be one or more haptic messages associated with the posting as directly determined by the sender or by an analysis performed in the data analysis module 146 and subsequent filtering performed by the haptic filter module 147. The message coordination module 148 can further manipulate the haptic message to create a plurality of varied haptic messages that are respectively sent to different selected subgroups of the recipients, such that each subgroup of the group receives a different haptic message along with the common post message. Thus, a first subgroup of recipients identified as Group 1 Recipients 304 receives a first "Haptic Message 1" 306, a second subgroup of recipients identified as Group 2 Recipients 308 receives a second "Haptic Message 2" 310, etc., with the nth "Haptic Message N" 314 being forwarded to the nth subgroup of recipients identified as Group N Recipients 312. Another aspect of the message coordination module 148 can be to provide a "Special Haptic Message" 318 to a group of Special Recipients 316. The Special Haptic Message 318 can be a user defined haptic message that has not been created or altered by the data analysis 146 or haptic filter modules 147 respectively. The user defined message can, for example, provide an additional layer of privacy with respect to communication between the sender and the identified Special Recipients 316.

In some implementations, a communication module 149 can be configured as a transmitter to facilitate communication between computing device 140 and receiving device 130. In other examples, the transmitter can be configured to operate as a transceiver, such that it can both deliver data as well as receive data. The established communication can include various wireless and/or wired communications. In some implementations, communication module 149 can configure computing device 140 as a centralized controller of receiving devices 130. In some implementations, communication module 149 can configure computing device 140 as a peer that communicates with receiving devices 130 and sending device 150. In some implementations, communication module 149 can configure computing device 140 as a hybrid centralized controller and peer, wherein computing device 140 can act as a centralized controller at some times (and/or with some receiving devices 130) and as a peer at other times (and/or with other receiving devices 130).

Non-transitory storage media 144 and other storage media described herein can include one or both of: system storage that is provided integrally (i.e., substantially non-removable) with computing device 140; and/or removable storage such as 120 of FIG. 2 that is removably connectable to computing device 140 via, for example, a port (e.g. a USB port, a firewire port, etc.); or a drive (e.g., a disk drive, etc.). In one embodiment, the storage media 144 can include a library 145. The library 145 can catalog the haptic effect parameters such as amplitude, frequency, waveform, duration, phase, pattern, attack time, fade time, lag/lead time, etc. There are two types of libraries: a private library for specific users and a general library shared by all users. Accordingly, when a specific haptic effect is determined for an individual or a group, a haptic drive signal can be coded using a combination of haptic effect parameters. The resultant haptic drive signal can produce the specific haptic effect at the haptic output device 136.

The catalog in the library can be based on user profiles established using data collected from receiving devices. Thus, combinations of haptic effect parameters can be stored when associated with a profile of a user. In other embodiments, the library of haptic effects can be accessible to the plurality receivers. Open accessibility to the library can facilitate a common language for interpreting haptic effects for the users. For example, interpreting the haptic effects may be facilitated through the haptic effects being predetermined. In other embodiments, the library 145 can contain a catalog of haptics customized by a sender.

Non-transitory storage media 144 and other storage media described herein can include one or more of: optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Non-transitory storage media 144 and other storage media described herein can include one or more virtual storage resources (e.g., cloud storage, a virtual private network, and/or other virtual storage resources). Non-transitory storage media 144 and other storage media described herein can store software algorithms, information determined by processor 142, information received from computing device 140, and/or other information that enables computing device 140 to function as described herein.

Processor 142 and other processors described herein are configured to provide information processing capabilities in computing device 140. As such, processor 142 and other processors described herein can include one or more of a digital processor, an analog processor, and a digital circuit designed to process information, an analog circuit designed to process information, a state machine, and/or other mechanisms for electronically processing information. Although processor 142 and other processors described herein, is illustrated in FIG. 1 as a single entity, it will be understood that this is for illustrative purposes only. In some implementations, processor 142 and other processors described herein can include a plurality of processing units. These processing units can be physically located within the same device, or processor 142 and other processors described herein can represent processing functionality of a plurality of devices operating in coordination. Processor 142 and other processors described herein can be configured to execute modules by software; hardware; firmware; some combination of software, hardware, and/or firmware; and/or other mechanisms for configuring processing capabilities on processor 142 and other processors described herein.

The various modules described herein are exemplary only. Other configurations and numbers of modules can be used, as well using non-modular approaches so long as the one or more physical processors are programmed to perform the functions described herein. It should be appreciated that although the various modules are illustrated in FIG. 1 as being positioned within a single processing unit, in implementations in which processor 142 includes multiple processing units; one or more modules can be located remotely from the other modules. The same applies to other modules shown as being positioned within one computing device 140. The description of the functionality provided by the different modules described herein is for illustrative purposes, and is not intended to be limiting, as any of the modules can provide more or less functionality than is described. For example, one or more of the modules can be eliminated, and some or all of its functionality can be provided by other ones of the modules. As another example, processor 142 can be configured to execute one or more additional modules that can perform some or all of the functionality attributed herein to one of the modules.

Figure 4:
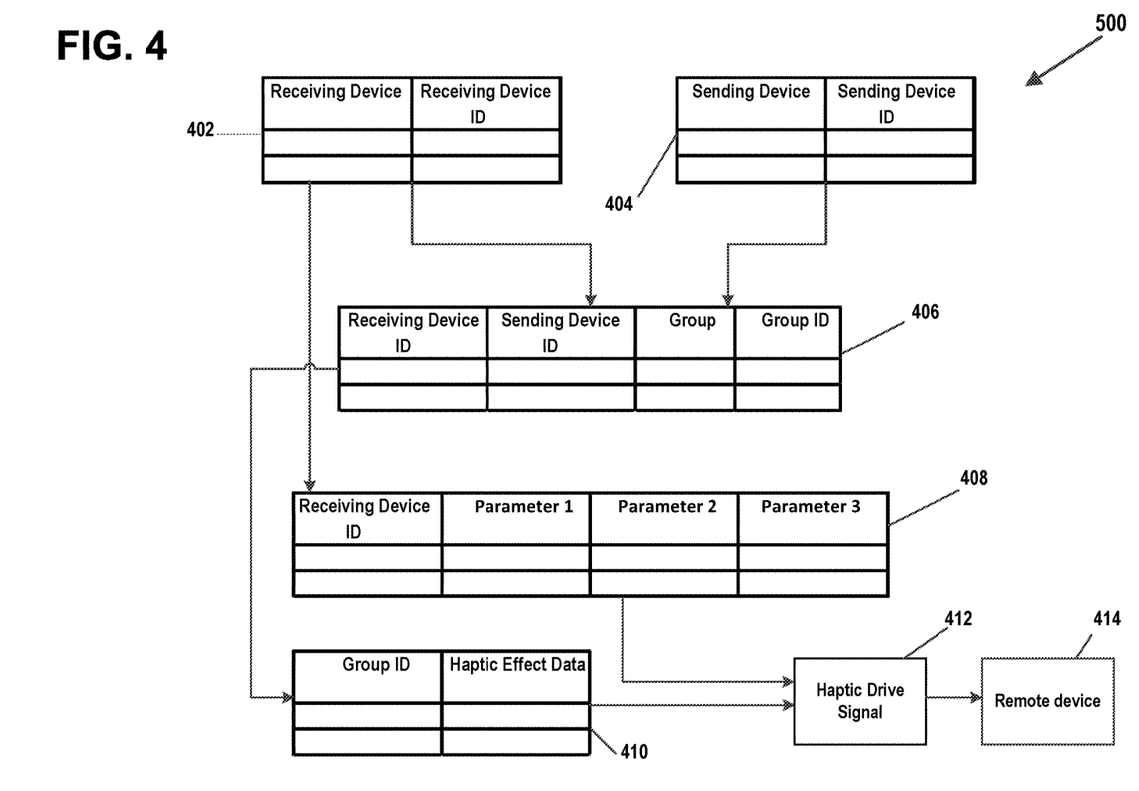
FIG. 4 is a block diagram illustrating a software architecture that could be used with the system of FIG. 1.

FIG. 4 depicts a diagrammatic flowchart illustrating the flow of categorized data to generate the appropriate haptic effect to send to a receiver. In FIG. 4, the flow of data through the data blocks can represent the processing of collected data by the data analysis module 146, haptic filter module 147, message coordination module 148, and communication module 149. As shown the output of the flow chart is the haptic drive signal 413, produced by the haptic drive signal generator 412. The data block 402 represents the flow of data from a receiving device 130. Within data block 402 the data can be arranged based on the receiving device 130 and on a unique receiving device identifier. In another aspect, data block 402 can be expanded to include additional profile information that characterizes the receiving device 130 and/or the user using the receiving device. For example, biometric information, haptic message preferences, and contextual information can be additional columns in data block 402. Similarly, data block 404 can have the same data architecture as that of data block 402. As the flow of collected data proceeds, data block 406 illustrates the grouping of receiving devices into subsets. For example, a sender can identify their recipient subsets based on a predetermined relationship such as friends, coworkers, and family, where each subset can be provided a group ID.

Data Block 408 illustrates the haptic effect parameters being associated with a receiving device identifier. The resultant association can indicate that a receiving device can receive the specified haptic effect, wherein the haptic effect is established based on the combination of data from the parameter columns 1-3. For example, if the receiving ID can identify John Smith's phone; haptic effect parameter 1 can be the frequency, haptic effect parameter 2 can be the amplitude, and haptic effect parameter 3 can be the duration. Further, block 410 can represent grouping of the receiving device subsets by group ID and associating a group ID with haptic effect data. For example, data block 408 can establish which group (subset) receives a celebratory haptic effect and which group (subset) receives a lamenting haptic effect. The data block 408 and data block 410 can be combined to produce the data for haptic drive signal 413. The haptic drive signal 413 can be sent to a plurality of remote devices 414. In another embodiment, the remote device 414 can represent specified receiving devices, wherein the data block associations establish the particular haptic effect that the specified receiving devices will receive.

Each stage of data flow can be categorically stored in the library 145 as a function of the data analysis module 146. When additional data is collected from the receiver block 402 and the sender block 404, the library can be updated, such that the message coordination module 148 uses the latest updated data to generate any updated haptic messages. In another embodiment, the library can store all data received, wherein updates to haptic message preferences are determined by the most recent data collected.

Figure 5:
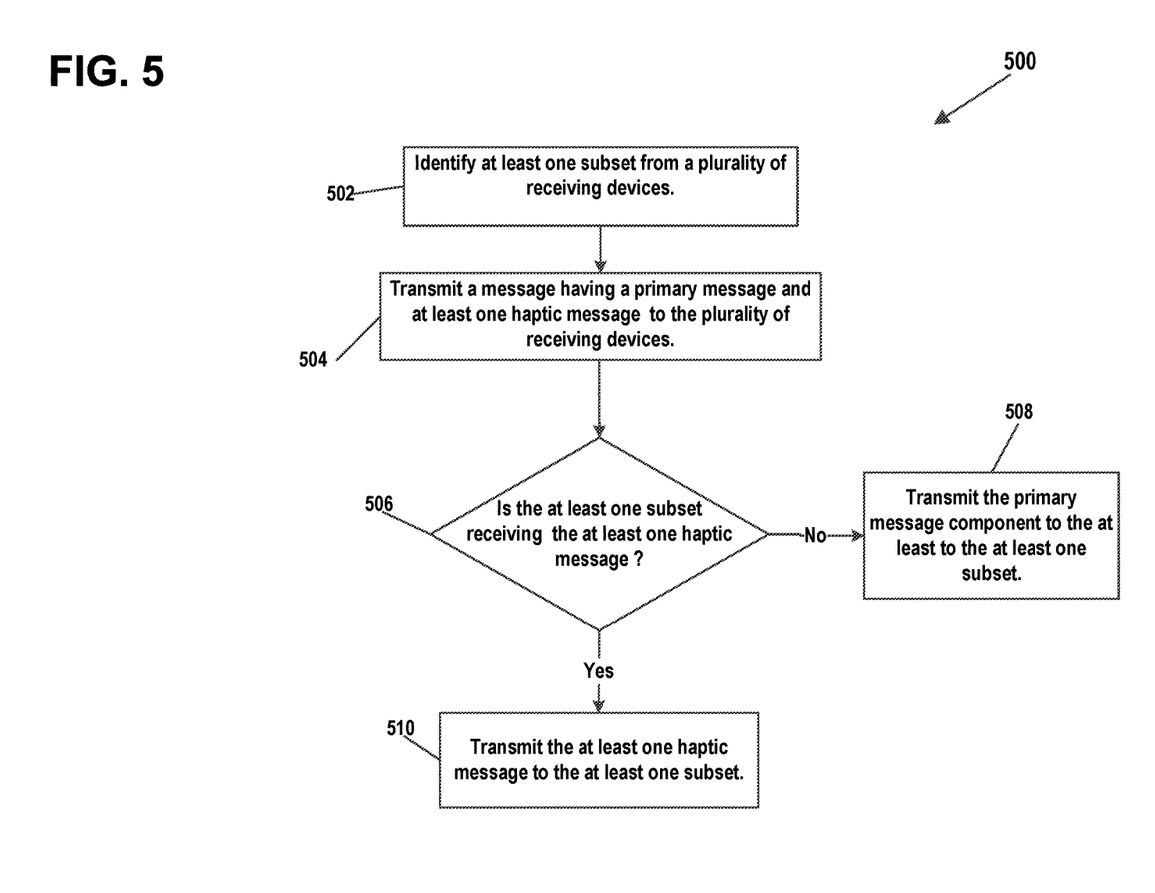
FIG. 5 is a flowchart describing a process for selectively delivering primary and haptic messages to a group and subsets of a group of receiving devices according to an embodiment of this disclosure.
Figure 6:
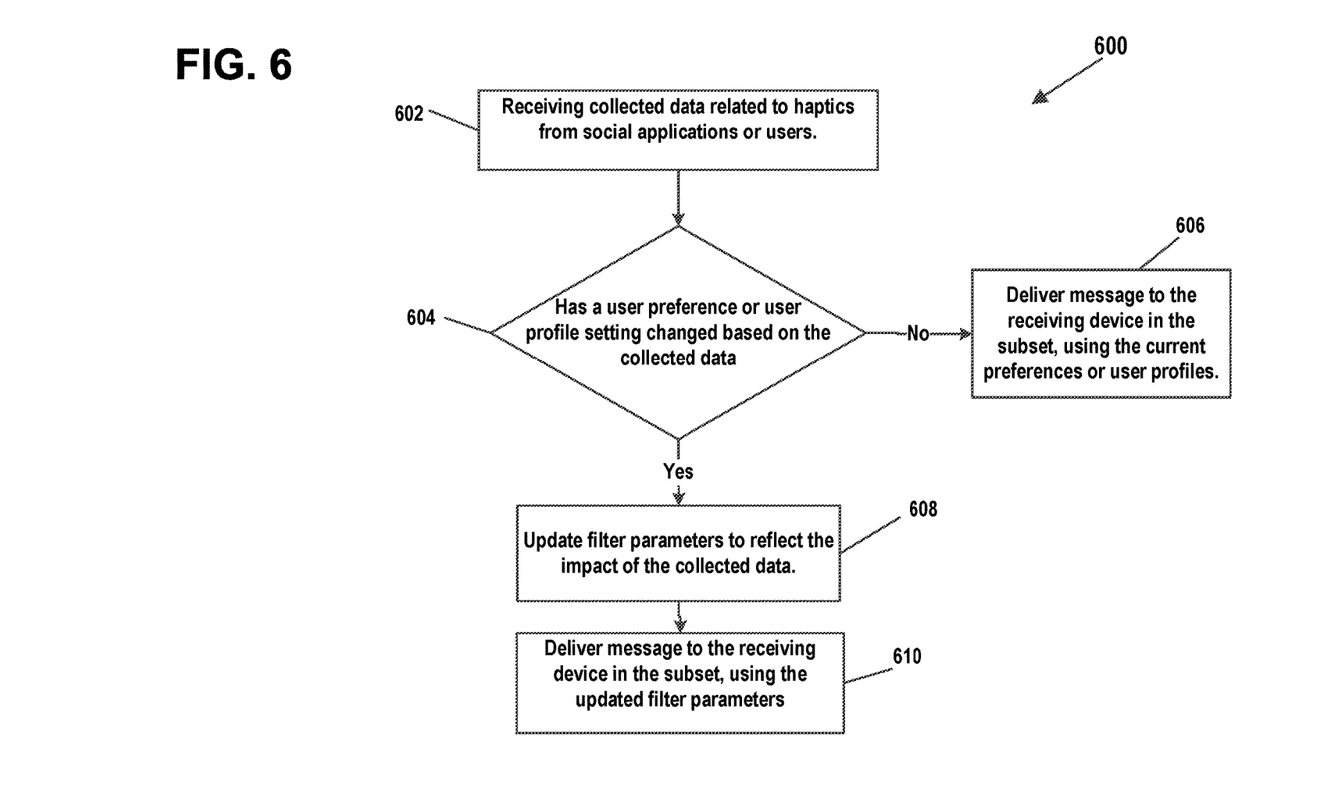
FIG. 6 is a flowchart illustrating a process for receiving haptic feedback and updating haptic parameters according to an aspect of the disclosure.

The various processing operations depicted in the flowcharts of FIG. 5, FIG. 6 and other Figures are described in greater detail herein. The described operations can be accomplished using some or all of the system components described in detail above. According to an aspect of the disclosure, various operations can be performed in different sequences. In other implementations, additional operations can be performed along with some or all of the operations shown in FIG. 5, FIG. 6, and other Figures, or some operations can be omitted. In yet other implementations, one or more operations can be performed simultaneously. Accordingly, the operations as illustrated (and described in greater detail below) are exemplary in nature and, as such, should not be viewed as limiting.

FIG. 5 illustrates an example of a method 500 for providing a posting or group message to a plurality of recipients (receiving devices), while simultaneous providing a haptic message to a predetermined subset of a plurality or general "group" of recipients. The method begins at operation 502, wherein the sender identifies or selects at least one subset of receiving devices from the plurality or group of potential receiving devices. According to one aspect of the operation 502, the identified receivers or receiving devices in a subset can be grouped based on a predetermined profile setting associated with the identified receivers. In other embodiments, the identified receivers can be grouped into a subset based on a user defined selection or operation. Progressing to operation 504, a message can be prepared for delivery to the receiving devices. The message has multiple components, a primary message component, and at least one haptic message component. According to one aspect of the operation 504 when applied to a social application, the message can be posted to a social application by the sender, or a group text can be sent to the plurality of recipients. The sender's intent is to send the primary message component to the entire group of recipients, and to send the at least one haptic message component only to the recipients (receiving devices) within the identified subset of recipients.

Once the message is prepared, the method proceeds to operation 506 which is a decision block, where a determination is made as to whether the identified receiver is an intended recipient of haptic message data. Before forwarding the message to the receiving devices, the plurality of intended recipients of the message is reviewed and it is determined whether a potential receiving device of the group is a member of the identified subset of block 502. If the receiving device under review is not a member of the identified subset (a "No" decision), the method proceeds to block 508, and only the primary message component is sent to the receiver. If the receiving device under review is a member of the identified subset (a "Yes" decision), the method proceeds to block 510, and the complete message having both the primary and the at least one haptic message component parts, is sent to the receiver. Accordingly only receiving devices within the identified subset will receive the at least one haptic effect portion of the message.

Alternative embodiments of the method for providing a posting or group message to a plurality of recipients are possible. For example, the system might provide a base haptic message to all receiving devices that are to receive a non-haptic message. Operation 506 might then determine whether one or a subset of the receiving devices are to receive no haptic message or an alternative haptic message, whether that alternative haptic message is manually set by a user or automatically selected through a filtering operation as discussed in more detail herein. If the determination is no, operation 508 might be modified to deliver the non-haptic message and the base haptic message to all of the receiving devices. If the determination is yes, operation 510 can be modified to deliver the base haptic message to all of the receiving devices other than the designated one or subgroup of receiving devices and then either no haptic message or a modified haptic message to the determined one or subgroup of receiving devices.

FIG. 6 illustrates an example process 600 for receiving haptic feedback data from the receiving devices and updating haptic parameters. Collected data from the users and interactions within, for example, social applications can be used to update recipient group preferences and to update individual preferences. Method 600 can initiate at operation 602, wherein haptic related data can be received from social applications or users, and collected and processed by devices such as the computing device 140. Based on analysis and processing of the collected haptic related data a determination is made in decision block 604 as to whether a user preference or user profile setting should be changed. If it is determined that no changes or modifications to the user preference or profile setting are to be made (a "No" decision), the method proceeds to block 606 in which the current/previous preferences or profile settings are used for delivering the message to the receiving device subset. If it is determined in block 604 that changes or modifications are necessary or desired (a "Yes" decision), the method proceeds to block 608 wherein filter parameters can be updated to change the user preference or profile setting to reflect the impact of the collected data. The method then proceeds to the operations of block 610, wherein a message can be delivered to the receiving device in the subset using the updated filtering parameters.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The claims are:

1. An apparatus for delivering a haptic effect, the apparatus comprising:
    a memory storing a message and haptic effect data defining the haptic effect;
    a transmitter configured to transmit the message and the haptic effect data; and
    a programmable circuit communicatively associated with the memory and the transmitter, the programmable circuit programmed to deliver the message to one or more receiving devices, the programmable circuit further programmed to deliver the haptic effect data to a subset of the receiving devices, each receiving device configured to deliver the haptic effect to a respective user,
    wherein the haptic effect data is determined by dynamically filtering data collected from the receiving devices to modify one or more haptic parameters associated with the respective user.

2. The apparatus for delivering a haptic effect according to claim 1, wherein:
    the receiving devices comprises at least first and second subsets of receiving devices; and
    the programmable circuit is programmed to deliver a first set of haptic effect data to the first subset of receiving devices and a second set of haptic effect data to the second subset of receiving devices.

3. The apparatus for delivering a haptic effect according to claim 1, wherein:
    the memory stores a haptic profile, the haptic profile identifying one or more receiving devices and associating each of the identified receiving devices to at least one predetermined set of haptic effect data; and
    the programmable circuit is programmed to selectively deliver to a receiving device the set of haptic effect data associated to that receiving device in the haptic profile.

4. The apparatus for delivering a haptic effect according to claim 1, further comprising:
    a user interface communicatively associated with the memory and the programmable circuit, the user interface configured to receive an input determining a set of haptic effect data to deliver to the subset of the receiving devices; and
    the programmable circuit is programmed to deliver the set of haptic effect data to the subset of receiving devices.

5. The apparatus for delivering a haptic effect according to claim 4, wherein:
    the memory stores one or more sets of haptic effect data; and
    the programmable circuit is programmed to deliver a set of haptic effect data selected from the sets of haptic effect data, the set of haptic effect data being selected through the user interface.

6. The apparatus for delivering a haptic effect according to claim 4, wherein:
    the programmable circuit is programmed to deliver a set of haptic effect data defined through the user interface.

7. The apparatus for delivering a haptic effect according to claim 1, wherein:
    the transmitter is configured to receive data from one or more remote devices;
    the memory stores data collected from the one or more remote devices; and
    the programmable circuit is programmed to generate a set of haptic effect data based on the data collected from the one or more remote devices.

8. The apparatus for delivering a haptic effect according to claim 7, wherein:
    the data collected from remote devices is associated with one or more users of the receiving devices.

9. The apparatus for delivering a haptic effect according to claim 7, wherein:
    the programmable circuit is programmed to deliver a prompt to a remote device, the prompt requesting feedback associated with haptic effects; and
    the data collected from remote devices is received in response to the prompt.

10. The apparatus for delivering a haptic effect according to claim 7, wherein:
    the data collected from remote devices is associated with one or more users of the receiving devices consists of data selected from a group consisting essentially of biometric data, data responsive to a questionnaire, and data identifying a type of receiving device.

11. The apparatus for delivering a haptic effect according to claim 7, wherein:
    the programmable circuit is programmed to generate the set of haptic effect data by modifying a preexisting set of haptic effect data.

12. The apparatus for delivering a haptic effect according to claim 11, wherein:
    the haptic effect data defines a drive signal for controlling a haptic output device; and
    the modification of the haptic effect data changes one or more defined parameters of the drive signal selected from a group consisting essentially of frequency, amplitude, period, phase, and duration.

13. The apparatus for delivering a haptic effect according to claim 7, wherein:
    the memory stores a haptic profile, the haptic profile identifying one or more receiving devices and associating each of the identified receiving devices to at least one predetermined set of haptic effect data; and
    the programmable circuit is programmed to retrieve a set of haptic effect data from the haptic profile for a predetermined receiving device, modify the retrieved set of haptic effect data based on data collected from remote devices, and deliver the haptic effect data to the predetermined receiving device.

14. The apparatus for delivering a haptic effect according to claim 13, wherein:
    the predetermined receiving device is the remote device from which data is collected.

15. The apparatus for delivering a haptic effect according to claim 13, wherein:
the data collected from a remote device is associated with a user of the predetermined receiving device.

16. A method for delivering a message and a haptic effect, the method comprising:
grouping a plurality of receiving devices into at least one subset of receiving devices based on an identifier associated with each receiving device in the plurality of receiving devices;
delivering a message to the receiving devices, each receiving device in the plurality of receiving devices having an identifier;
associating at least one haptic effect to the subset of receiving devices based on the identifier associated with each receiving device in the at least one subset of receiving devices; and
transmitting the haptic effect to the subset of receiving devices, each receiving device of the subset of receiving devices configured to deliver the haptic effect to a respective user,
wherein the haptic effect is determined by dynamically filtering data collected from the subset of receiving devices to modify one or more haptic parameters associated with the respective user.

17. The method of claim 16, wherein the method further includes receiving collected data from the one or more receiving devices.

18. The method of claim 17, wherein the method further includes updating the haptic effect sent to the subset of receiving devices based on the collected data received from the one or more receiving devices.

19. An apparatus for delivering a haptic effect, the apparatus comprising:
a memory that stores a message, a haptic profile, haptic effect data, and data received from one or more receiving devices, wherein the haptic effect data defines a haptic effect, the haptic profile identifying the receiving devices and associating each of the identified receiving devices to at least one predetermined set of haptic effect data;
a transmitter configured to:
transmit the message and the haptic effect data, and
receive data from remote devices; and
a programmable circuit communicatively associated with the memory and the transmitter, the programmable circuit programmed to deliver the message to the receiving devices, the programmable circuit further programmed to:
selectively deliver the set of haptic effect data to a subset of the receiving devices,
generate the set of haptic effect data based on the data collected from remote devices,
update the set of haptic effect data by modifying a preexisting set of haptic effect data, and
deliver the haptic effect data to at least one receiving device in the subset of receiving devices,
wherein each receiving device of the subset of receiving devices is configured to deliver the haptic effect to a respective user, and wherein the set of haptic effect data is determined by dynamically filtering the data collected to modify one or more haptic parameters associated with the respective user.

20. The apparatus for the haptic effect data according to claim 19, wherein:
the remote device is a receiving device.

21. An apparatus for delivering a haptic effect to at least one receiving device of a type having an installed social application and having haptic message support, and being capable of transmitting feedback information back to the apparatus, comprising:
a memory configured to store a message, a haptic profile, haptic effect data defining a haptic effect, and feedback information received from the at least one receiving device; wherein the haptic profile identifies the at least one receiving device and associates the identified at least one receiving device to at least one predetermined set of haptic effect data;
a transmitter configured to transmit the message and the haptic effect data, and to receive the feedback information from the at least one receiving device; and
a programmable circuit communicatively associated with the memory and the transmitter, the programmable circuit being programmed to retrieve a set of haptic effect data from the haptic profile for the at least one receiving device, to dynamically modify the retrieved set of haptic effect data based on the received feedback information from the identified at least one receiving device, and to deliver the haptic effect data to the at least one receiving device that is configured to deliver the haptic effect to a user,
wherein the haptic effect data is determined by dynamically filtering the received feedback information from the identified at least one receiving device to modify one or more haptic parameters associated with the user.

22. The apparatus of claim 21, wherein the programmable circuit includes dynamic haptic filters to tune outgoing and incoming haptic messages based on data analysis.

* * * * *